(No Model.)
F. H. CHESEBRO.
HAND SEED DRILL.
No. 327,234. Patented Sept. 29, 1885.
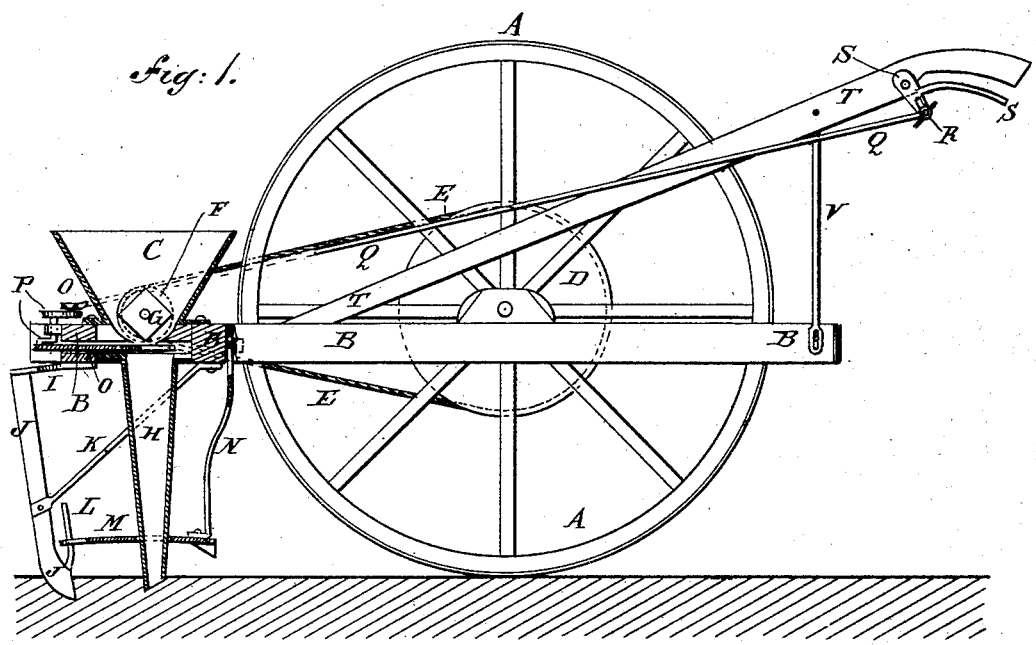
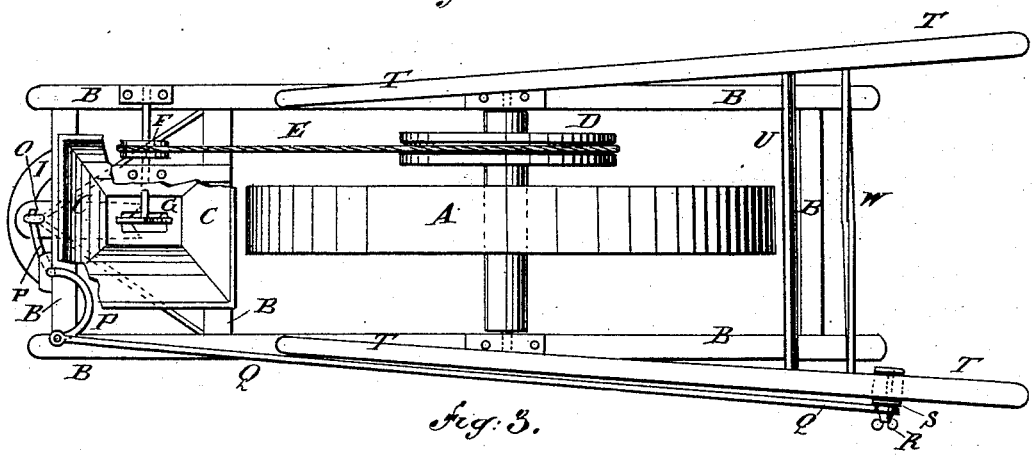
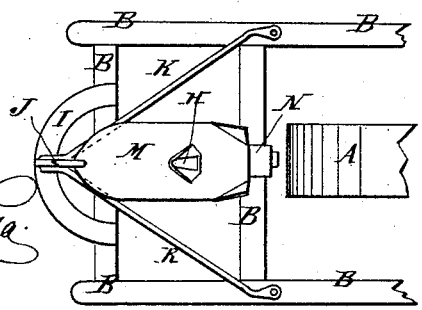
WITNESSES:
Chas. Nida
C. Sedgwick
INVENTOR:
F. H. Chesebro
BY
ATTORNEYS.
N. PETERS, Photo-Lithographer, Washington, D. C.

UNITED STATES PATENT OFFICE.

FRANK HOWARD CHESEBRO, OF SOUTH HAVEN, MICHIGAN.

HAND SEED-DRILL.

SPECIFICATION forming part of Letters Patent No. 327,234, dated September 29, 1885.

Application filed September 3, 1884. (No model.)

*To all whom it may concern:*

Be it known that I, FRANK HOWARD CHESEBRO, of South Haven, in the county of Van Buren and State of Michigan, have invented certain new and useful Improvements in Hand Seed-Drills, of which the following is a full, clear, and exact description.

Reference is to be had to the accompanying drawings, forming part of this specification, in which similar letters of reference indicate corresponding parts in all the figures.

Figure 1 is a side elevation, partly in section, of one of my improved hand seed-drills. Fig. 2 is a plan view of the same, parts being broken away. Fig. 3 is an under side view of the forward part of the same.

The object of this invention is to facilitate the drilling of small seeds, and promote convenience and accuracy in such drilling.

The invention consists of the combination of parts, substantially as hereinafter described, and pointed out in the claim.

The seed-box is provided with a sliding plate having a discharge-opening, and connected by a bent lever and a rod with an elbow-lever pivoted to a handle of the drill.

The furrow-opening seed-conducting spout has flanges upon the sides of its lower end to prevent it from being thrust into the ground and choked with soil.

Upon the furrow-opening seed-conducting spout is placed a plate connected at its forward end with an upwardly-projecting pin attached to the lower end of the colter, and connected at its rear end by a slotted bar with a cross-bar of the frame, whereby the seed can be planted at any desired depth and covered, as will be hereinafter fully described.

A represents the wheel, the rim of which is made wide to prevent it from sinking into the soil and to adapt it to press the soil down upon the seed. The journals of the wheel A revolve in bearings attached to the side bars of the frame B, to the forward end of which is attached the seed-box C. The seed-box C is made with a concaved bottom, in which is formed an oblong or diamond shaped opening for the escape of the seed.

To the hub or journal of the wheel A is secured a grooved pulley, D, around which passes a band, E. The band E also passes around a smaller pulley, F, journaled to a side bar of the frame B and a side of the seed-box C. To the end of the inner journal of the pulley F is attached a sheet-metal disk, G, having four, more or less, angles, and which is so placed that its angles will sweep through the discharge-opening of the seed-box C, and thus keep the seed from clogging the said opening, and cause the seed to pass out regularly and in uniform quantities.

To the bottom of the seed-box C is attached the upper end of the spout H, the lower end of which is made triangular in form to adapt it to open a furrow to receive the seed. The rear parts of the lower edges of the sides of the spout H are bent outward, as shown in Fig. 3, to prevent the lower end of the said spout from being thrust into the ground and becoming filled with soil.

To the lower side of the forward cross-bar of the frame B are attached the ends of a semi-annular bar, I, to the center of which is attached the upper end of the colter J, which is strengthened against the draft-strain by two braces, K. The forward ends of the braces K are secured to the middle part of the colter J, and their rear ends are attached to the side bars of the frame B. The lower end of the colter J is curved to the rearward, as shown in Fig. 1, so that should the said colter strike a root or other obstruction that it cannot cut it will rise and pass over the said obstruction and thus prevent the machine from being stopped or broken.

To the rear side of the lower end of the colter J is attached the lower end of an upwardly-projecting pin, L, which passes through a hole in the forward end of the plate M. The plate M, a little in the rear of its center, has an opening formed through it to receive the lower part of the conducting-spout H. To the rear end of the plate M is attached the lower end of a bar, N, the upper end of which is slotted to receive the screws that secure it to the inner cross-bar of the frame B, so that the plate M can be readily adjusted higher or lower, as may be desired. The plate M thus serves as a gage to regulate the depth at which the seed is deposited in the soil, and causes the said seed to be planted at a uniform depth. The rear corners of the plate or shoe M are bent downward, as shown in Figs. 1 and 3, to adapt the rear end of the said plate to serve as a coverer.

The amount of seed discharged is regulated, and its discharge prevented, when desired, by a plate, O, sliding in a recess in the bottom of the seed-box C, which plate has an opening formed through it corresponding with the discharge-opening in the seed-box bottom. To the forward end of the sliding plate O is pivoted the inner end of a bent lever, P, which is fulcrumed to the forward cross-bar of the frame B, and to its outer end is pivoted the forward end of the rod Q. The rear end of the rod Q is pivoted by a thumb-screw, R, to the short arm of the elbow-lever S, which is pivoted at its angle to one of the handles T. The short arm of the lever S is slotted to receive the thumb-screw R, so that the throw of the rod Q can be readily regulated by adjusting the said thumb-screw.

The forward ends of the handles T are attached to the forward parts of the side bars of the frame B, and their rear ends are held at the proper distance apart by a round, U.

The rear ends of the handles T are supported at their proper height by the bars V and braces W, the upper ends of which are attached to the said handles, and their lower ends are attached to the side bars of the frame B. The lower ends of the bars V and braces W are slotted to receive the fastening-bolts, so that the rear ends of the handles can be readily raised and lowered as the height of the operator may require.

Having thus described my invention, what I claim as new, and desire to secure by Letters Patent, is—

In a hand seed-drill, the combination, with the colter J, the spout H, and the frame B, of the pin L, the gage and cover plate M, and the slotted supporting-bar N, substantially as herein shown and described, whereby the seed can be planted at any desired depth and covered, as set forth.

FRANK HOWARD CHESEBRO.

Witnesses:
   C. J. MONROE,
   LYMAN S. MONROE.